United States Patent Office 3,156,671
Patented Nov. 10, 1964

3,156,671
METHOD FOR PREPARING TRIOXANE-CYCLIC ETHER COPOLYMERS
Hans A. Suter and Francis B. McAndrew, Corpus Christi, Tex., assignors to Celanese Corporation of America, New York, N.Y., a corporation of Delaware
No Drawing. Filed Mar. 28, 1960, Ser. No. 17,759
10 Claims. (Cl. 260—67)

This invention relates to an improved method for producing tough, high molecular weight copolymers of trioxane.

It is known that trioxane may be copolymerized with cyclic ethers having adjacent carbon atoms to produce oxymethylene copolymers having lower thermal degradation rates than oxymethylene homopolymers. A description of such copolymers and of their preparation may be found in Application S. No. 718,148, filed by Walling, Brown and Bartz on February 28, 1958, now Patent No. 3,027,352, March 27, 1962.

As disclosed in said application, polymerization is conducted in solution with the trioxane and cyclic ether being dissolved in a common solvent, with the polymer coming out of solution as a solid phase as it is formed.

It is an object of this invention to provide a method for producing high yields of high molecular weight copolymers of trioxane and a cyclic ether having adjacent carbon atoms. Other objects will appear hereinafter.

In accordance with this invention, there is provided a process for obtaining high molecular weight oxymethylene copolymers which comprises copolymerizing trioxane with a cyclic ether having adjacent carbon atoms in a system wherein said trioxane and said cyclic ether are dissolved in an inert non-aqueous solvent, precipitating trioxane by cooling said system and continuing the copolymerization process while said trioxane is in its precipitated state.

In accordance with this process, polymerization is initiated in a solution containing a large amount of trioxane and a small amount of the cyclic ether having adjacent carbon atoms. After the polymerization is initiated, the temperature is reduced to precipitate solid trioxane from the solution and the polymerization is permitted to proceed to completion or to any desired degree. The cyclic ether with adjacent carbon atoms, being present in substantially smaller proportions than the trioxane, remains in solution at the lower temperature.

The copolymers produced in accordance with this invention contain oxymethylene groups and oxyalkylene groups having adjacent carbon atoms. The preferred copolymers are those containing from 60 to 99.6 mol percent of recurring oxymethylene groups and most preferably 85 to 99.6 mole percent.

Among the copolymers which are prepared in accordance with this invention are those having a structure comprising recurring units having the formula

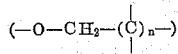

wherein $n$ is an integer from zero to 5 and wherein $n$ is zero in from 60 to 99.6 percent of the recurring units.

A preferred class of copolymers are those having a structure comprising recurring oxymethylene units and recurring oxyethylene units and having from 60 to 99.6 percent of recurring oxymethylene units. These copolymers are prepared by copolymerizing trioxane with a cyclic ether having the structure

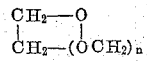

where $n$ is an integer from zero to two.

Among the specific cyclic ethers which may be used are ethylene oxide, 1,3,5-trioxepane, 1,3-dioxane, tri-methylene oxide, pentamethylene oxide, 1,2-propylene oxide, 1,2-butylene oxide, neopentyl formal, pentaerythritol diformal, paraldehyde, tetrahydrofuran and butadiene monoxide.

Any of the known catalysts for the polymerization of trioxane may be used in accordance with this invention. It is known, for example that inorganic fluorine-containing catalysts, such as antimony trifluoride, antimony fluoborate, bismuth trifluoride, bismuth oxyfluoride, nickelous fluoride, aluminum trifluoride, titanium tetrafluoride, manganous fluoride, manganic fluoride, mercuric fluoride, silver fluoride, zinc fluoride, ammonium bifluoride, phosphorus pentafluoride, hydrogen fluoride and fluosulfonic acid are effective caltalysts for polymerizing trioxane to a tough, high molecular weight material. Also effective are thionyl chloride, organic sulfonic acids, phosphorus trichloride, titanium tetrachloride, ferric chloride, zirconium tetrachloride, aluminum trichloride, stannous chloride and stannic chloride.

The preferred catalysts used in the preparation of the copolymers are acidic boron fluoride-containing catalysts, such as boron fluoride itself, boron fluoride, coordinate complexes with organic compounds in which oxygen or sulfur is the donor atom, boron fluoride complexes with water and boron fluoride complexes with basic nitrogen or phosphorus containing compounds having a dissociation constant in water at 25° C. of less than $1\times10^{-9}$. Catalysts of this type are disclosed in U.S. applications S. Nos. 691,144 and 691,143, filed by Hudgin and Berardinelli on October 21, 1957 now Patent Nos. 2,989,507, June 20, 1961 and 2,989,506, June 20, 1961, respectively, S. No. 718,124, now abandoned, filed by Hudgin and Berardinelli on February 28, 1958 and S. No. 782,411, filed by Schnizer on December 23, 1958, now Patent No. 2,989,511, June 20, 1961. The disclosures of the aforementioned applications are incorporated herein by reference.

The most preferred catalysts are the boron fluoride coordinate complexes with organic compounds in which oxygen is the donor atom, such as boron fluoride etherates and particularly boron fluoride dibutyl etherate.

Preferably, the boron-fluoride containing catalyst should be present in the polymerization zone in amounts such that its boron fluoride content is between about $1\times10^{-4}$ and about $5\times10^{-2}$ weight percent based on the weight of monomers in the polymerization zone. Most preferably, amounts between about $1\times10^{-4}$ and about $6.5\times10^{-3}$ weight percent should be used.

The enhanced yields and high molecular weights obtained in the process of this invention are directly related to the procedure used and to the fact that polymerization is initiated in solution. When particles of solid trioxane are suspended directly in a liquid medium containing dissolved comonomer, from the solid phase without solution, as by mechanical grinding, the system does not produce the high yield and the high molecular weight products of this invention. When trioxane is precipitated from solution in an inert non-aqueous solvent containing dissolved comonomer and polymerization is thereafter begun by addition of the polymerization catalyst, high yields of high molecular weight products are not produced.

The temperature for polymerization initiation will depend upon the nature of the solvent, the trioxane and comonomer concentrations therein and the nature of the polymerization catalyst. In general, temperatures between about 50° and about 70° C. will be used and preferably between about 54° and 66° C.

The solvent may be any inert, non-aqueous and preferably substantially non-polar organic solvent for trioxane. Among the inert, non-aqueous solvents which may be used are hydrocarbons, such as cyclohexane, hexane, heptane, octane, benzene and toluene; and halogen-substituted hydrocarbons, such as 1,2-dichloroethane, methylene chloride and chloroform.

Solvents having substantially greater solubility for trioxane at higher temperatures than at lower temperatures or which, from another point of view, have very little change in precipitation temperature with substantial change in trioxane concentration, are preferred. In cyclohexane, for example, trioxane at a 35% concentration, based on the weight of solution, precipitates at 51–52° C. and at 75% concentration precipitates out at 54–55° C.

The catalyst may be added to the solution, or it may be added to the solvent prior to the solution of trioxane and comonomer therein. For best results, the catalyst should be soluble in the non-polar solvent. Because of the small quantity of catalyst employed, its solubility in the solvent can be of very low order.

The amount of solvent used in the polymerization will depend upon the temperature of the polymerization initiation and polymerization completion steps and upon the nature of the solvent and its solvent power for the trioxane and for the comonomer. Generally, suitable weight ratios of trioxane to solvent are between about 1 to 2 and 20 to 1. It is to be noted that the trioxane may be present in greater quantity than the solvent. It is to be understood that the terms "solvent" and "dissolved in" as used herein, relate to any normally liquid material which, at the temperature of polymerization initiation, forms a single liquid phase with the comonomers and do not denote or imply that the material is the major constituent.

To obtain copolymers of highest molecular weight, it is preferred that the reaction system be anhydrous, or substantially anhydrous. The average molecular weight of the polymer will be increased even if suspended solid phase polymerization is begun after polymerization has taken place to a considerable extent. However, the polymerization continuation step is preferably started after not more than 10% of the trioxane has been polymerized from solution, and most preferably after polymer formation has just begun.

The temperature of the suspended phase polymerization step will depend primarily upon the nature of the solvent and to a lesser extent on the trioxane concentration and the activity of the catalyst. Generally, the temperatures between about −10° and 60° C. will be used and preferably between about 0° and about 55° C.

During the polymerization initiation step, it is preferred to agitate the solution. After the initial polymer is formed and the solution is cooled, it is preferred to continue the agitation at a rate sufficient to prevent local overheating.

When polymerization is carried out in accordance with the preferred aspects of the above-described procedures, polymers are obtained in high yields having molecular weight corresponding to inherent viscosities (I.V.) above 1.0 and usually between 1.0 and 3.5 (measured in 0.1% solution in p-chlorophenol and containing 2% alphapinene at 60° C.). The polymers produced in accordance with this invention are useful in the preparation of molded objects of exceptional toughness and stability.

The yields of polymer produced in accordance with the above described procedures are also high, generally above about 70% and sometimes as high as 94% of the trioxane used.

The time required for the final polymerization step is from about 30 minutes to about 16 hours. For best results, the initial polymerization step is kept as short as possible (until polymer formation is visible to the eye) the final polymerization step is carried out for a period between about 30 minutes and about 2 hours.

The process described above is adapted to produce copolymers of very high molecular weights. For some purposes, such as for ease of molding, particularly in the preparation of films, it may be desired to produce copolymers of lower, but controlled, molecular weight. In accordance with another aspect of this invention controlled molecular weight copolymers are obtained by copolymerizing trioxane and a cyclic ether having adjacent carbon atoms in a reaction mixture containing from about 20 to 200 p.p.m. of water, based on the total weight of monomers. Preferably, the water is introduced in controlled amount to a substantially anhydrous system. If desired, water may be left in the system by controlled dehydration from a higher water concentration. The polymerization process for controlled molecular weight copolymers, in its most preferred aspect is the two stage polymerization discussed above wherein polymerization is initiated in solution and continued with suspended trioxane particles. However, other polymerization processes which normally produce high molecular weight copolymers may be modified to produce copolymers of controlled lower molecular weights by the inclusion of water in the amounts specified above.

Within the range of water concentrations between 20 and 200 p.p.m., changes in the amount of water will change the molecular weight with large amounts of water producing copolymers of lower molecular weight.

EXAMPLES I TO VII

In each of the following polymerization reactions, trioxane was copolymerized with 2.5% by weight of dioxolane for two hours in a system containing 65 p.p.m. (based on the weight of trioxane) of boron trifluoride (as boron trifluoride dibutyl etherate). Cyclohexane, as a solvent was present in a trioxane-cyclohexane weight ratio of 2.33. The precipitation temperature for the trioxane in this system was 54° C. The temperature and reaction period for the solution polymerization and the temperature and reaction period for the precipitate polymerization, the water content of the system and the inherent viscosities and yields of products are shown in Table I.

*Table I*

| Example | Solution Polymerization | | Precipitate Polymerization | | Water, p.p.m. | I.V.[a] | Yield, percent |
| --- | --- | --- | --- | --- | --- | --- | --- |
| | Time (hrs.) | Temp., ° C. | Time (hrs.) | Temp., ° C. | | | |
| I | 0.6 | 55–60 | 1.4 | 54 | 14 | 1.4 | 79 |
| II | 0.67 | 54–67 | 1.33 | 54 | 26 | 1.8 | 67 |
| III | 0.75 | 55–57 | 1.25 | 54 | 29 | 1.7 | 70 |
| IV | 0.25 | 55.5 | 1.75 | 53.0–53.5 | 0 | 2.0 | 89 |
| V | 2.0 | 55.5–60 | | | 0 | 1.1 | 75 |
| VI[b] | 0.5 | 60–67 | 1.5 | 45 | | 1.68 | 80 |
| VII[c] | 1.0 | 59–65 | 1.0 | 44–47 | | 2.16 | 94 |

[a] Measured in 0.1 weight percent in p-chlorophenol containing 2 weight percent alphapinene.
[b] 2.9% dioxolane.
[c] 1.82% of ethylene oxide in place of dioxolane.

EXAMPLES VIII TO X

In each of the following polymerization reactions at different water concentrations, trioxane was copolymerized with 2.0% by weight of dioxolane for two hours in a system containing 0.015 wt. percent (based on the weight of trioxane) of boron trifluoride (as boron trifluoride dibutyl etherate). Cyclohexane, as a solvent, was present in a trioxanecyclohexane, as a solvent, was present in a trioxanecyclohexane weight ratio of 1.5. The polymerization temperatures were not permitted to drop below 60° C. and the reactants remained in liquid phase. The yields and inherent viscosities (measured as above) at the different levels of water content are shown in Table II.

*Table II*

| Example | Water (p.p.m.) | I.V. | Yield, percent |
|---|---|---|---|
| VIII | 20 | 1.04 | 79 |
| IX | 30 | 0.95 | 77 |
| X | 150 | 0.62 | 71 |

It is to be understood that the foregoing detailed description is given merely by way of illustration and that many variations may be made therein without departing from the spirit of our invention.

Having described our invention what we desire to secure by Letters Patent is:

1. A process for obtaining high molecular weight oxymethylene copolymers which comprises copolymerizing trioxane with a cyclic ether having adjacent carbon atoms in a system wherein said trioxane and said cyclic ether are dissolved in an inert non-aqueous solvent, precipitating unreacted trioxane by cooling said system and continuing the copolymerization process while said trioxane is in its precipitated state.

2. A process for obtaining high molecular weight oxymethylene copolymers which comprises copolymerizing trioxane with a cyclic ether having two adjacent carbon atoms in a system wherein said trioxane and said cyclic ether are dissolved in an inert non-aqueous solvent, precipitating unreacted trioxane by cooling said system and continuing the copolymerization process while said trioxane is in its precipitated state.

3. A process for obtaining high molecular weight oxymethylene copolymers which comprises initiating the copolymerization of trioxane and dioxolane in a system wherein said trioxane and said dioxolane are dissolved in an inert non-aqueous solvent, cooling said system to a lower temperature to precipitate unreacted trioxane in said solvent and continuing the copolymerization at said lower temperature.

4. A process for obtaining high molecular weight oxymethylene copolymers which comprises copolymerizing trioxane and ethylene oxide in a system wherein said trioxane and said ethylene oxide are dissolved in an inert non-aqueous solvent, precipitating unreacted trioxane by cooling said system and continuing the copolymerization process while said trioxane is in its precipitated state.

5. A process for obtaining high molecular weight oxymethylene copolymers which comprises initiating the copolymerization of 60 to 99.6 mol percent of trioxane and 0.4 to 40 mol percent of a cyclic ether having adjacent carbon atoms in a system wherein said trioxane and said cyclic ether are dissolved in an inert non-aqueous solvent, cooling said system to a lower temperature to precipitate unreacted trioxane in said solvent and continuing the copolymerization at said lower temperature.

6. A process for obtaining high molecular weight oxymethylene copolymers which comprises initiating the copolymerization of trioxane and a cyclic ether having adjacent carbon atoms in a substantially anhydrous system wherein said trioxane and said cyclic ether are dissolved in an inert non-aqueous non-polar hydrocarbon solvent, precipitating unreacted trioxane by cooling said system and continuing the copolymerization process while said trioxane is in its precipitated state.

7. A process for obtaining high molecular weight oxymethylene copolymers which comprises initiating the copolymerization of trioxane and a cyclic ether having adjacent carbon atoms in a system wherein said trioxane and said cyclic ether are dissolved in an inert non-aqueous solvent, the trioxane to solvent weight ratio being between about 1 to 2 and 20 to 1, cooling said system to a lower temperature to precipitate unreacted trioxane in said solvent and continuing the copolymerization at said lower temperature.

8. A process for obtaining controlled molecular weight copolymers which comprises copolymerizing trioxane and a cyclic ether having adjacent carbon atoms in a reaction mixture containing from about 20 to 200 p.p.m. of water based on the total weight of the monomers.

9. In the process for obtaining oxymethylene copolymers wherein trioxane is copolymerized with a cyclic ether having adjacent carbon atoms the improvement which comprises regulating the molecular weight of said oxymethylene copolymers by including a controlled proportion of water, between about 20 and 200 p.p.m. based on the total weight of monomers.

10. A process for obtaining high molecular weight oxymethylene copolymers which comprises initiating the copolymerization of 60 to 99.6 mol percent of trioxane and 0.4 to 40 mol percent of a cyclic ether having adjacent carbon atoms in a system wherein said trioxane and said cyclic ether are dissolved in an inert non-aqueous solvent, said system containing from 20 to 200 p.p.m. of water based on the total weight of the monomers, cooling said system to a lower temperature to precipitate unreacted trioxane in said solvent and continuing the copolymerization at said lower temperature.

References Cited in the file of this patent

UNITED STATES PATENTS

| | | |
|---|---|---|
| 2,457,224 | Gresham | Dec. 28, 1948 |
| 2,989,508 | Hudgin et al. | June 20, 1961 |
| 2,989,509 | Hudgin et al. | June 20, 1961 |
| 2,989,510 | Bruni | June 20, 1961 |
| 3,027,352 | Walling et al. | Mar. 27, 1962 |

OTHER REFERENCES

Furukawa et al.: Journal of Polymer Science, vol. 36, No. 130 (1959), pp. 541–543.